(12) United States Patent
Takenaka et al.

(10) Patent No.: US 10,072,940 B2
(45) Date of Patent: Sep. 11, 2018

(54) FORCE SENSE PRESENTATION DEVICE, FORCE SENSE PRESENTATION SYSTEM, AND FORCE SENSE PRESENTATION METHOD

(71) Applicant: SONY CORPORATION, Tokyo (JP)

(72) Inventors: Mikio Takenaka, Kanagawa (JP); Akira Ono, Kanagawa (JP); Yasuhiro Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/505,131

(22) PCT Filed: Jul. 9, 2015

(86) PCT No.: PCT/JP2015/003456
§ 371 (c)(1),
(2) Date: Feb. 20, 2017

(87) PCT Pub. No.: WO2016/031118
PCT Pub. Date: Mar. 3, 2016

(65) Prior Publication Data
US 2017/0254662 A1 Sep. 7, 2017

(30) Foreign Application Priority Data
Aug. 29, 2014 (JP) .................................. 2014-175014

(51) Int. Cl.
*G06F 3/01* (2006.01)
*G01C 21/36* (2006.01)
*G08B 7/06* (2006.01)

(52) U.S. Cl.
CPC ......... *G01C 21/3652* (2013.01); *G08B 7/066* (2013.01); *G01C 21/3614* (2013.01); *G01C 21/3664* (2013.01); *G01C 21/3667* (2013.01)

(58) Field of Classification Search
CPC .. G01C 21/3652; G09B 21/003; A61H 3/061; G06F 3/016; G06F 3/01; H04M 19/04; G08B 6/00
See application file for complete search history.

(56) References Cited

U.S. PATENT DOCUMENTS 8,588,464 B2 * 11/2013 Albertson .............. A61H 3/061
340/435
9,092,954 B2 * 7/2015 Visitacion ................ G08B 6/00
(Continued)

FOREIGN PATENT DOCUMENTS

AU 2011229916 A1 11/2012
CA 2793714 A1 9/2011
(Continued)

OTHER PUBLICATIONS

The Fifth International Workshop on Haptic Audio Interaction Design Conference, Copenhagen, 2010, (Year: 2010).*
(Continued)

*Primary Examiner* — Yuri Kan
(74) *Attorney, Agent, or Firm* — Chip Law Group

(57) ABSTRACT

A force sense presentation device includes a movable body, an actuator unit, a posture detection unit, a signal generation unit, and a control unit. The actuator unit is connected to the movable body. The posture detection unit is configured to detect posture of the force sense presentation device. The signal generation unit is configured to generate a driving signal for generating vibration on the actuator unit, the vibration having within a period at least one of a plurality of different amplitudes and a plurality of different frequencies. The control unit is configured to control the generation of the driving signal by the signal generation unit depending on the detected posture.

8 Claims, 14 Drawing Sheets

(56) References Cited

U.S. PATENT DOCUMENTS

| | | | |
|---|---|---|---|
| 9,256,281 B2* | 2/2016 | Ur | G06F 3/01 |
| 9,299,244 B2* | 3/2016 | Pakula | H04M 19/04 |
| 9,384,679 B2* | 7/2016 | Alalawi | G09B 21/003 |
| 9,400,557 B2* | 7/2016 | Baskaran | G06F 3/016 |
| 2005/0231466 A1* | 10/2005 | Tada | G06F 3/016 345/156 |
| 2011/0187658 A1 | 8/2011 | Song et al. | |
| 2013/0115579 A1 | 5/2013 | Taghavi | |

FOREIGN PATENT DOCUMENTS

| | | |
|---|---|---|
| CN | 102141856 A | 8/2011 |
| EP | 2550751 A1 | 1/2013 |
| JP | 2004-177360 A | 6/2004 |
| JP | 2011-159110 A | 8/2011 |
| JP | 2011-159280 A | 8/2011 |
| JP | 2013-524315 A | 6/2013 |
| KR | 10-2011-0088825 A | 8/2011 |
| KR | 10-2013-0066579 A | 6/2013 |
| NZ | 603201 A | 11/2014 |
| WO | 2011/119233 A1 | 9/2011 |

OTHER PUBLICATIONS

International Search Report and Written Opinion of PCT Application No. PCT/JP2015/003456, dated Sep. 8, 2015, 6 pages of English Translation and 6 pages of ISRWO.

International Preliminary Report on Patentability of PCT Application No. PCT/JP2015/003456, dated Mar. 9, 2017, 6 pages of English Translation and 4 pages of IPRP.

\* cited by examiner

| Example 1 | Amplitude | Frequency |
|---|---|---|
| Waveform 1 | A | $f_1 < f < f_2$ |
| Waveform 2 | A | $f < f_1$, or $f_2 < f$ |

| Example 2 | Amplitude | Frequency |
|---|---|---|
| Waveform 1 | B | $f_0 < f$ |
| Waveform 2 | B | $f < f_0$ |

| Example 3 | Amplitude | Frequency |
|---|---|---|
| Waveform 1 | A | $f_1 < f < f_2$ |
| Waveform 2 | C | $f_1 < f < f_2$ |

| Example 4 | Amplitude | Frequency |
|---|---|---|
| Waveform 1 | A | $f_1 < f < f_2$ |
| Waveform 2 | C | $f < f_1$ |

FIG.5

FORCE SENSE PRESENTATION DEVICE, FORCE SENSE PRESENTATION SYSTEM, AND FORCE SENSE PRESENTATION METHOD

CROSS REFERENCE TO RELATED APPLICATIONS

This application is a U.S. National Phase of International Patent Application No. PCT/JP2015/003456 filed on Jul. 9, 2015, which claims priority benefit of Japanese Patent Application No. JP 2014-175014 filed in the Japan Patent Office on Aug. 29, 2014. Each of the above-referenced applications is hereby incorporated herein by reference in its entirety.

TECHNICAL FIELD

The present technology relates to a force sense presentation device, a force sense presentation system, and a force sense presentation method that present a force sense such as a tactile sense and a pressure sense to a user.

BACKGROUND ART

For example, in Patent Literature 1, an apparatus that guides a user to his/her destination is disclosed. The user does not need to look at a map for guide. This apparatus includes a plurality of gyro motors, generates an angular momentum vector in an arbitrary direction and size, and generates a torque by the time derivative by independently driving and controlling the plurality of gyro motors. This apparatus generates a torque corresponding to the direction to which the user should be guided and the distance on the basis of location information and destination information of the user on the map (see, for example, paragraphs 0062, 0073, and 0077 of the specification of Patent Literature 1).

CITATION LIST

Patent Literature

Patent Literature 1: Japanese Patent Application Laid-open No. 2004-177360

DISCLOSURE OF INVENTION

Technical Problem

The above-mentioned Patent Literature 1 does not disclose any new method about a method of presenting a force sense. Further, this method of using a torque that represents a temporal change in angular momentum has such a problem that it is difficult to reduce the size of an apparatus and it needs large electric power to generate a necessary torque value, and it is not possible to sequentially present a torque.

It is an object of the present technology to provide a force sense presentation device, a force sense presentation system, and a force sense presentation method that use a new method of presenting a force sense.

Solution to Problem

In order to achieve the above-mentioned object, a force sense presentation device according to the present technology includes a movable body, an actuator unit, a posture detection unit, a posture detection unit, a signal generation unit, and a control unit.

The actuator unit is connected to the movable body.

The posture detection unit is configured to detect posture of the force sense presentation device.

The signal generation unit is configured to generate a driving signal for generating vibration on the actuator unit, the vibration having within a period at least one of a plurality of different amplitudes and a plurality of different frequencies.

The control unit is configured to control the generation of the driving signal by the signal generation unit depending on the detected posture.

The movable body vibrates by the vibration of the actuator unit by the driving signal of the signal generation unit. Therefore, it is possible to present a force sense in a predetermined direction between the movable body and a body.

The control unit may be configured to cause the signal generation unit to generate the driving signal depending on the detected posture so as to present a force sense in a particular direction in a global coordinate system, the global coordinate system being a three-dimensional space coordinate system, the force sense presentation device being used in the three-dimensional space coordinate system.

Accordingly, it is possible to present a force sense in a particular direction in a global coordinate system to a user while the force sense presentation device is in arbitrary posture.

The force sense presentation device may further include a position calculation unit configured to acquire information on a present location of the force sense presentation device on a map and calculate a destination on the map and a path from and the present location to the destination. The control unit may be configured to calculate a direction on the path to be presented as the force sense on the basis of information on the present location and the path.

Accordingly, it is possible to achieve navigation with force sense presentation by the signal generation unit.

The control unit may include a determination unit configured to determine whether or not a posture angle of the force sense presentation device is within a range of angles set in the global coordinate system. The control unit may be configured to cause the signal generation unit to generate the driving signal when the posture angle is within the range of set posture angles.

Accordingly, only in the case where the force sense presentation device is within the range of predetermined posture angles in three-dimensional space, the force sense presentation device is capable of presenting a force sense to the user. Accordingly, it is possible to easily distinguish whether or not the traveling direction of his/her own is right.

The signal generation unit may be configured to generate a driving signal such that the actuator unit moves along a first direction under a first frequency and along a second direction opposite to the first direction under a second frequency different from the first frequency.

The signal generation unit may be configured to generate a driving signal such that the actuator unit moves along a first direction under a first amplitude and along a second direction opposite to the first direction under a second amplitude different from the first amplitude.

According to the force sense presentation device, it is possible to present, to the user, various tactile senses of a force sense such as a variably controlled frictional force depending on the first direction and the second direction opposite thereto.

The signal generation unit may be configured to generate a driving signal such that a vibration having an amplitude and a frequency obtained on the basis of a detection threshold value of a tactile receptor is generated on the actuator unit.

The force sense presentation device uses a detection threshold value of the tactile receptor as a designing value, which makes it possible to use the amplitude or frequency corresponding to the tactile area and the non-tactile area, and to present various tactile senses of a force sense such as a frictional force to the user.

A force sense presentation system according to an embodiment of the present technology includes a force sense presentation device, a signal generation unit, and a control unit.

The force sense presentation device includes the movable body, the actuator unit, and the posture detection unit.

The signal generation unit is configured to generate a driving signal for generating vibration on the actuator unit, the vibration having within a period at least one of a plurality of different amplitudes and a plurality of different frequencies.

The control unit is configured to control the generation of the driving signal by the signal generation unit depending on the detected posture.

A force sense presentation method according to an embodiment of the present technology includes detecting posture of a force sense presentation device, the force sense presentation device including a movable body and an actuator unit connected to the movable body.

A driving signal for generating vibration on the actuator unit is generated, the vibration having within a period at least one of a plurality of different amplitudes and a plurality of different frequencies.

The generation of the driving signal is controlled depending on the detected posture.

Advantageous Effects of Invention

According to the present technology, it is possible to provide a force sense presentation device and the like that use a new method of presenting a force sense.

It should be noted that the effect described here is not necessarily limitative and may be any effect described in the present disclosure.

BRIEF DESCRIPTION OF DRAWINGS

FIG. 5 A table showing an example of a vibration waveform having the amplitude and frequency areas obtained on the basis of the tactile receptor.

MODE(S) FOR CARRYING OUT THE INVENTION

Hereinafter, embodiments of the present technology will be described with reference to the drawings.

[Configuration of Force Sense Presentation Device]

Figures 1A, 1B:
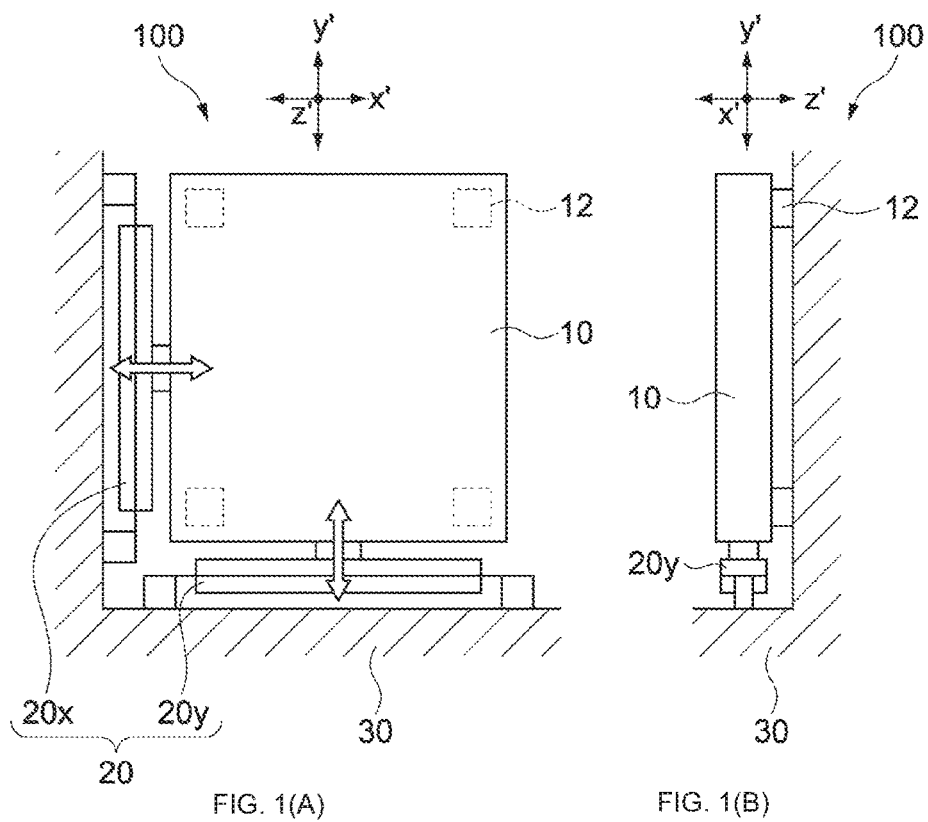
FIGS. 1(A) and 1(B) Diagrams schematically showing a main portion of the internal structure of a force sense presentation device according to an embodiment of the present technology.

FIGS. 1(A) and 1(B) are diagrams schematically showing a main portion of the internal structure of a force sense presentation device according to an embodiment of the present technology. This force sense presentation device 100 is a portable device, e.g., wearable device.

The force sense presentation device 100 includes, for example, a movable body 10 and an actuator unit 20 connected to this movable body 10. The movable body 10 is formed in a plate shape, for example. The force sense presentation device 100 includes an enclosure 30, and the movable body 10 constitutes a part of the enclosure 30. Specifically, the force sense presentation device 100 is configured so that a user is capable of touching the movable body 10. Alternatively, the force sense presentation device 100 may be configured so that the user is capable of recognizing a reaction force of the movable body 10 by touching the enclosure 30.

The movable body 10 does not need to have a display function. However, a display panel or touch panel may be integrally connected to the movable body 10. Alternatively, the movable body 10 itself may be configured as a display panel and a touch panel. The movable body 10 is connected to the enclosure 30 with, for example, a plurality of supporting members 12, and vibratably supported.

The actuator unit 20 is housed in the enclosure 30. The actuator unit 20 gives two-axis degree of freedom to the movable body 10, for example. Specifically, the actuator unit 20 includes an X actuator 20x and a Y actuator 20y. The X actuator 20x and the Y actuator 20y are connected to and supported by the enclosure 30. A plurality of X actuators 20x and a plurality of Y actuators 20y may be provided. The X actuator 20x generates vibration in an x-direction on the movable body 10. The Y actuator 20y generates vibration in a y-direction on the movable body 10. With the combination of the actuators 20x and 20y, the movable body 10 is capable of vibrating in an x'-y' plane.

The X actuator 20x and the Y actuator 20y have substantially the same configuration, and are each formed of a piezoelectric device, for example. As the piezoelectric device, a bimorph piezoelectric device is employed, for example. However, it may be a unimorph piezoelectric device.

Figure 2:
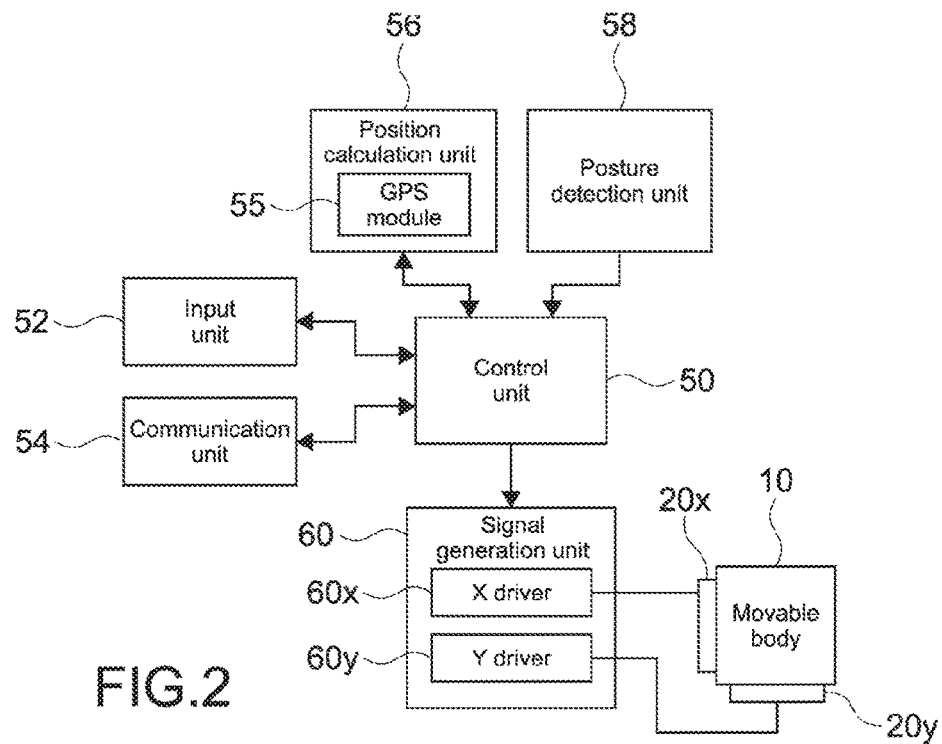
FIG. 2 A block diagram functionally showing the configuration of the force sense presentation device.

FIG. 2 is a block diagram functionally showing the configuration of the force sense presentation device 100. This force sense presentation device 100 is a device that is configured to able to be worn by the body of the user and achieves a navigation system. The force sense presentation device 100 includes a control unit 50, an input unit 52, a position calculation unit 56, a posture detection unit 58, a communication unit 54, and a signal generation unit 60 in addition to the movable body 10 and the actuator unit 20.

The control unit 50 has a function of collectively controlling the operation of this force sense presentation device 100. The control unit 50 mainly controls generation of a driving signal by the signal generation unit 60 depending on posture of the force sense presentation device 100 detected by the posture detection unit 58, as will be described later. The control unit 50 may be configured as a chip physically integrated with the signal generation unit 60, or as a separate chip.

The input unit 52 includes a touch panel, a button, and the like. The user is capable of operating the touch panel, the button, and the like. For example, the user inputs a destination for navigation to the control unit 50 via the input unit 52.

In the following, a coordinate system fixed for the force sense presentation device 100 is represented by x', y', and z' axes, and an inertial coordinate system on the earth, i.e., a coordinate system in three-dimensional space is represented by x, y, and z axes for convenience of description. The coordinate system of x', y', and z' axes is referred to as the local coordinate system, and the coordinate system of x, y, and z axes is referred to as the global coordinate system.

The posture detection unit 58 detects posture of the force sense presentation device 100 in the global coordinate system. The posture detection unit 58 includes, for example, an acceleration sensor, a gyro sensor (angular velocity sensor), and a geomagnetic sensor, which are not shown. For example, it is possible to calculate the posture of the force sense presentation device 100 in the global coordinate system by using a biaxial acceleration sensor and a biaxial gyro sensor, as disclosed in Japanese Patent No. 4325707. Alternatively, it is possible to calculate the position of the force sense presentation device 100 in the global coordinate system by using a triaxial acceleration sensor, a triaxial gyro sensor, and a triaxial geomagnetic sensor, as disclosed in Japanese Patent Application Laid-open No. 2012-128617. (angle of the force sense presentation device with respect to the x, y, and z axes)

The position calculation unit 56 includes a GPS (Global Positioning System) module 55, and thus, has a function of acquiring information on the present location of the force sense presentation device 100 on a map. Further, the position calculation unit 56 has a function of calculating a destination on the map, which is input and set by the user. The map information may be stored in a storage unit (not shown) in advance. Alternatively, a map on cloud may be used.

The communication unit 54 includes, for example, a wide area communication module and a narrow area communication module, which are not shown. The wide area communication module has a function of performing communication by being connected to a public network such as the Internet. The narrow area communication module has a function of communicating with another device by using a wireless LAN (Local Area Network), Bluetooth (registered trademark), infrared communication, RFID (Radio Frequency Identification), or the like.

The signal generation unit 60 has a function of generating a driving signal for generating vibration having within a period at least one of a plurality of different amplitudes and a plurality of different frequencies on the actuator unit 20 under the control of the control unit 50. Specifically, the signal generation unit 60 includes an X driver 60x and a Y driver 60y. The X driver 60x generates a driving signal for driving the X actuator 20x, and the Y driver 60y generates a driving signal for driving the Y actuator 20y.

A part of the control unit 50, the position calculation unit 56, and the like includes hardware such as a CPU (Central Processing Unit), a RAM (Random Access Memory), a ROM (Read Only Memory), and a non-volatile memory. In the ROM or non-volatile memory, a program that is necessary for the operation according to this embodiment is stored. The control unit 50 may include a PLD (Programmable Logic Device), a DSP (Digital Signal Processor), and the like, in addition to or instead of the CPU.

Figures 3A, 3B:
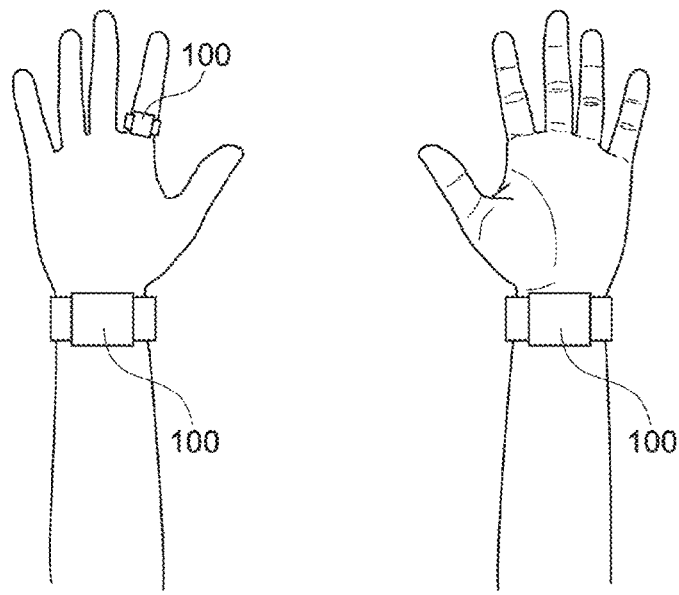
FIGS. 3(A) and 3(B) Diagrams showing an example of the state where a user wears the force sense presentation device.

FIGS. 3A and 3B each show an example of the state where the user wears the force sense presentation device 100. For example, as shown in FIG. 3A, the user wears the force sense presentation device 100 as a wrist band-type device or a ring-type device. In this case, the user wears the force sense presentation device 100 in such a way that the movable body 10 of the force sense presentation device 100 is in contact with the body of the user. As shown in FIG. 3B, the user may wear the wrist band-type force sense presentation device 100 in FIG. 3A in an orientation opposite to the wearing orientation of the wrist band-type force sense presentation device 100 in FIG. 3A.

Vibration Waveform

1) Detection Threshold Value of Tactile Receptor

Figure 4:
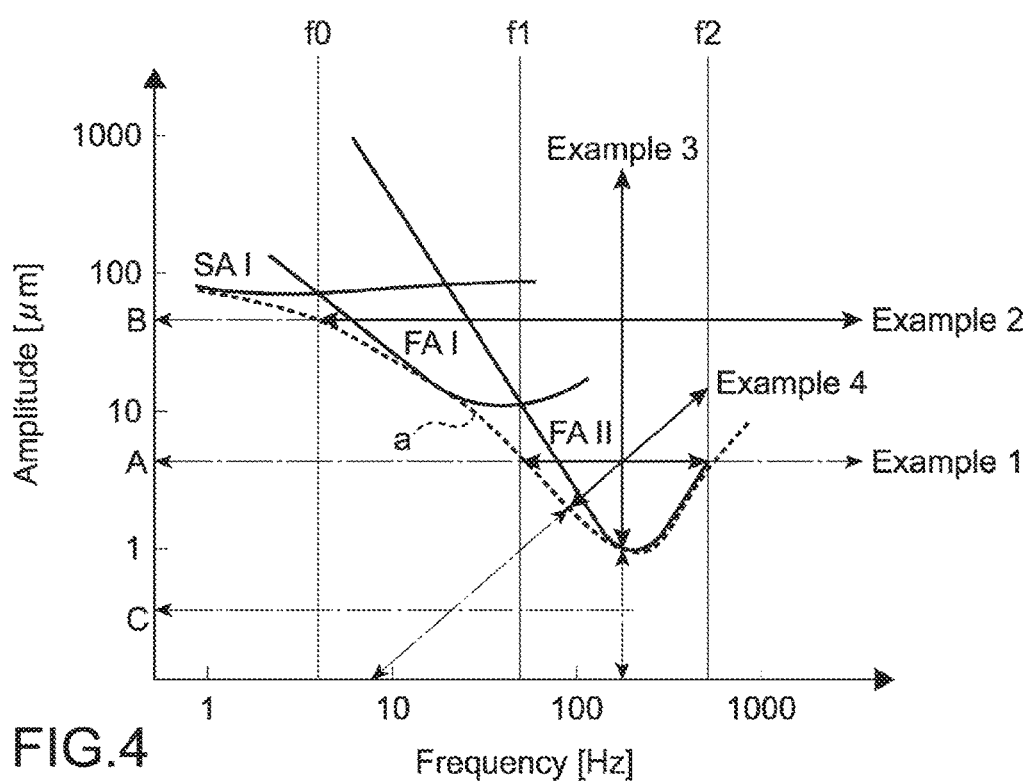
FIG. 4 A graph showing detection threshold values of a plurality of types of tactile receptors of persons against vibration.

FIG. 4 is a graph showing a detection threshold value of a plurality of types of tactile receptors of persons against vibration, for example. The horizontal axis represents the frequency (Hz), and the vertical axis (μm) represents the amplitude. Examples of the types of tactile receptors of persons include SA I, FA I, and FA II. Specifically, it is generally known that there are an amplitude area and a frequency area for each type of the tactile receptors, which can be detected or cannot be detected by persons.

The assumption is made that an envelope a (represented by dashed line) of these types of threshold values is the detection threshold value herein. The area on or above the envelope is an area in which persons can perform detection, i.e., the tactile area. On the other hand, the area less than the envelope a (area below the envelope a) is an area in which persons cannot perform detection, i.e., the non-tactile area. According to the present technology, by applying such a detection threshold value of the tactile receptor, for example, it is possible to present various tactile senses of a force sense such as a frictional force to the user.

Specifically, the force sense presentation device 100 generates a special vibration waveform that allows the amplitude area of a non-tactile sense to a tactile sense or the frequency area of a non-tactile sense to a tactile sense to coexist within a period of vibration, and presents various tactile senses of a force sense such as a frictional force between the movable body 10 and the body, as a main embodiment.

2) Example of Vibration Waveform

FIG. 5 is a table showing an example of a vibration waveform having the amplitude and frequency areas obtained on the basis of this tactile receptor. These examples 1 to 4 each show that the one period has two kinds of vibration waveforms 1 and 2. Frequencies f0, f1, and f2 and amplitudes A, B, and C shown in FIG. 5 correspond to those shown in the graph representing the detection threshold value of the tactile receptor shown in FIG. 4. The content of the tables is shown as follows.

Example 1

Waveform 1 (tactile area): Amplitude A, Frequency f1<f<f2
Waveform 2 (non-tactile area): Amplitude A, Frequency f<f1 or f2<f Example 2

Waveform 1 (tactile area): Amplitude B, Frequency f0<f
Waveform 2 (non-tactile area): Amplitude B, Frequency f<f0

Example 3

Waveform 1 (tactile area): Amplitude A, Frequency f1<f<f2
Waveform 2 (non-tactile area): Amplitude C, Frequency f1<f<f2

Example 4

Waveform 1 (tactile area): Amplitude A, Frequency f1<f<f2
Waveform 2 (non-tactile area): Amplitude C, Frequency f<f1

Specifically, these vibrations each include at least one of a plurality of different amplitudes (a first amplitude and a second amplitude) and a plurality of different frequencies (a first frequency and a second frequency) within a period.

In the present technology, the above-mentioned vibrations of the tactile area and the non-tactile area only have to coexist within a period of a vibration, and the combination of the frequencies and the amplitudes is not limited.

As long as it follows the detection threshold value of the tactile receptor, it is possible to generate various tactile senses of a force sense such as an effective frictional force that can be sufficiently felt by persons by using relatively high frequencies between 100 Hz to 200 Hz, for example, even if a small amplitude area (e.g., A) is used.

2-1) Embodiment Using Vibration Waveform According to [Example 1]

Figure 6A:
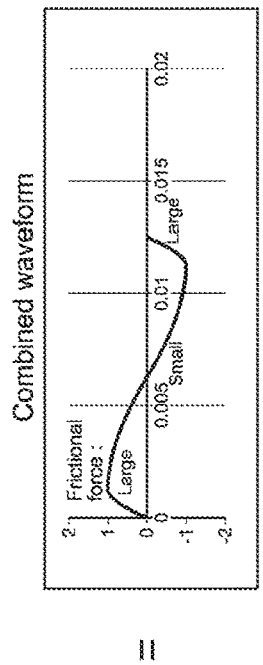
FIG. 6A A diagram showing a vibration waveform corresponding to an example 1 of the table of FIG. 5.
Figure 6A:
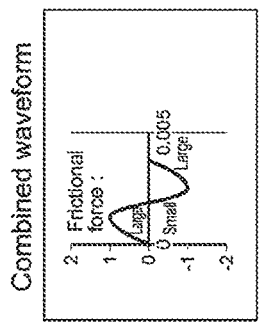
Figure 6B:
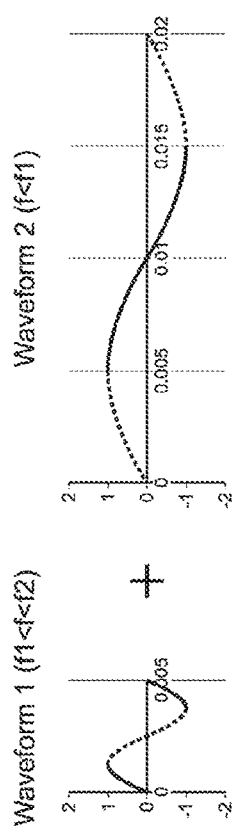
FIG. 6B A diagram showing a vibration waveform corresponding to the example 1 of the table of FIG. 5.
Figure 6B:
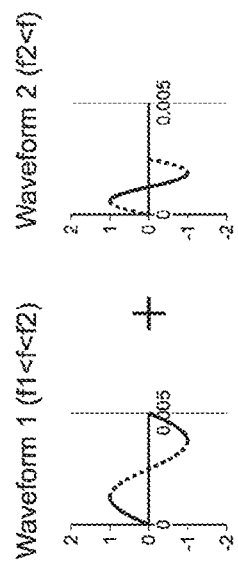

FIGS. 6A and 6B each show a vibration waveform corresponding to the above-mentioned example 1. Values of the vertical axis (amplitude) and the horizontal axis (time) are normalized. FIG. 6A corresponds to the frequency f<f1 regarding the waveform 2, and FIG. 6B corresponds to the frequency f2<f regarding the waveform 2. As an example, it is possible to set A≈5 um and f≈200 Hz as the waveform 1. Portions of the waveforms 1 and 2, which are represented by solid lines, are combined, thereby obtaining a vibration waveform shown by the "combined waveform."

The signal generation unit 60 supplies the driving signal to the actuator unit 20 to vibrate the actuator unit 20 (and the movable body 10) like this. The waveform of the electric signal output from the signal generation unit 60 is substantially similar to the combined waveform shown in FIGS. 6A and 6B. In this case, the vibration amplitude and the voltage match. Now, for illustrative purposes, a vibration waveform in one axial direction of any of the X actuator 20X and the Y actuator 20Y will be described. The same shall apply to waveforms shown in FIGS. 7A and 7B.

In readdress to the waveforms shown in FIGS. 6A and 6B, the solid line part and the dashed line part of the waveform 1 and the waveform 2 are separated on the basis of the forward path and the return path of the vibration in one axial direction, for example. Specifically, the solid line part of the waveform 1 is set as the forward path (here, direction in which the positive value of the graph increases), and the solid line part of the waveform 2 is set as the return path (here, the direction in which the negative value of the graph increases). That is, the signal generation unit 60 is capable of giving vibration having a tactile area in one direction (here, the forward path) and a non-tactile area in a direction opposite thereto (here, the return path) to the actuator unit 20 (and the movable body 10).

Figure 7A:
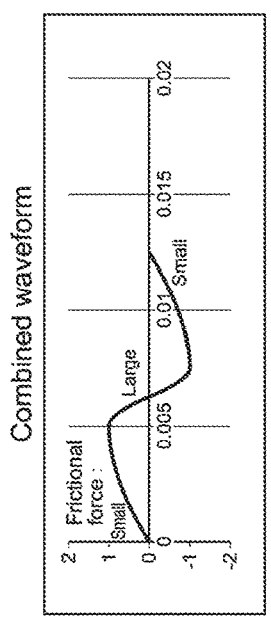
FIG. 7A A diagram showing another example of a vibration waveform corresponding to the example 1.
Figure 7A:
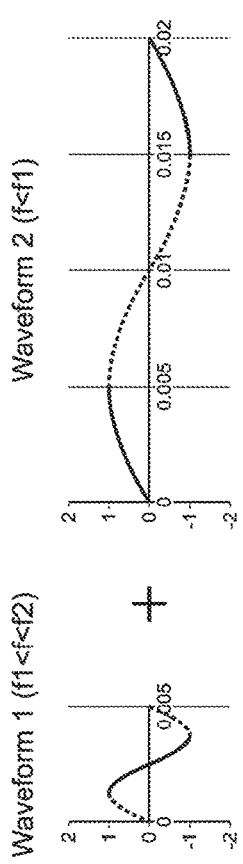
Figure 7B:
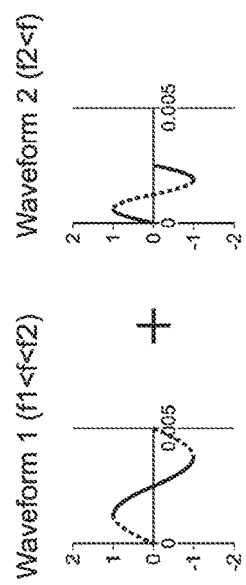
FIG. 7B A diagram showing another example of a vibration waveform corresponding to the example 1.

FIGS. 7A and 7B each show another example of the vibration waveform corresponding to the above-mentioned example 1. In FIGS. 7A and 7B, the magnitude of the frictional force on the forward path and the return path is opposite to that in FIGS. 6A and 6B. Specifically, the vibration waveform of the non-tactile area of the waveform 2 is used on the forward path, and the vibration waveform of the tactile area of the waveform 1 is used on the return path.

In the above, only the vibration waveform according to the example 1 has been described. However, it goes without saying that the force sense presentation device 100 is capable of presenting, to the user, various tactile senses of a force sense such as a frictional force by using the vibration waveforms (=driving signals) according to the examples 2 to 4.

2-2) Embodiment Using Parabolic Vibration Waveform

Figure 8:
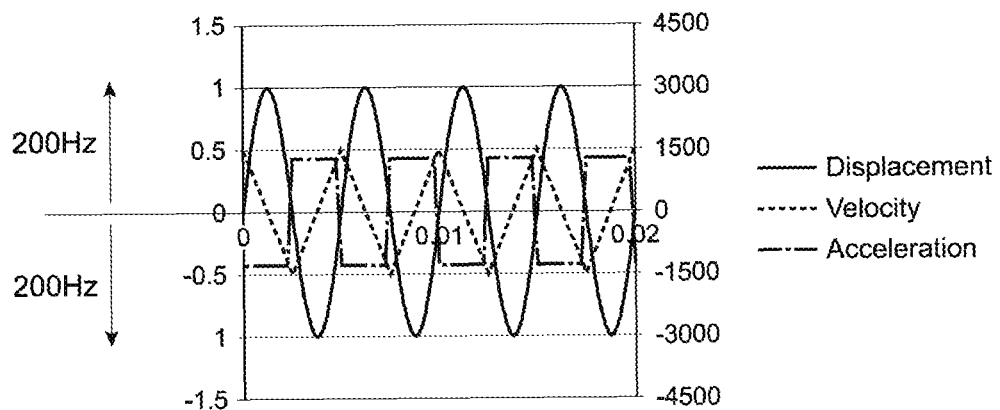
FIG. 8 A diagram showing an example of a parabolic vibration waveform (no acceleration directionality).
Figure 9:
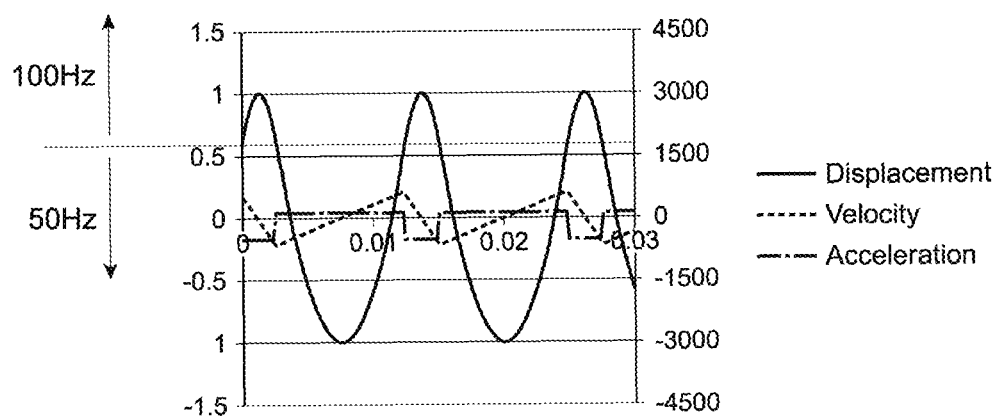
FIG. 9 A diagram showing an example of a parabolic vibration waveform (small force sense).
Figure 10:
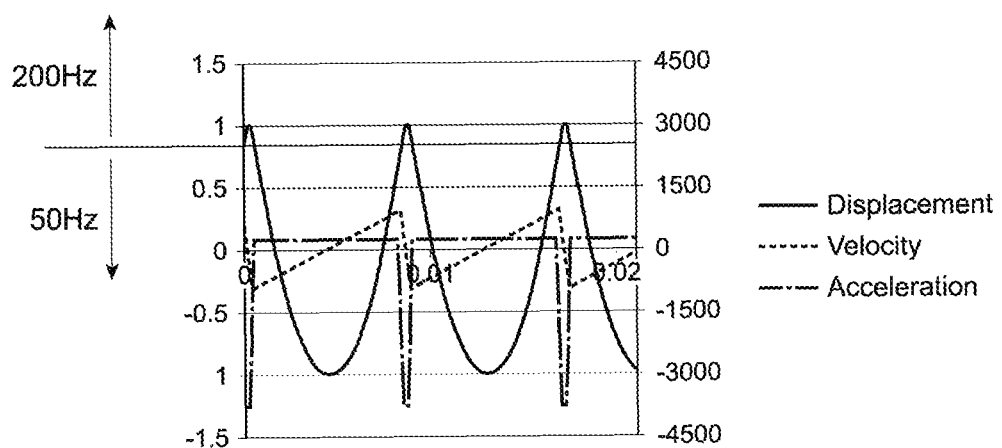
FIG. 10 A diagram showing an example of a parabolic vibration waveform (large force sense).

The next technique tries to present a clearer force sense by using not only the detection threshold value of the tactile receptor as shown in FIG. 5 but also a parabolic vibration waveform (not sinusoidal). FIGS. 8, 9, and 10 each show an example of the parabolic vibration waveform. The waveform in a half period represents a parabola. The horizontal axis represents time, and the vertical axis represents an amplitude (left side), a velocity, and an acceleration (right side). The respective values thereof are normalized.

In the vibration waveforms shown in FIGS. 8, 9, and 10, the time when the polarity (positive and negative) of the acceleration, which is a second order derivative of this vibration waveform, is switched is defined as a half period.

The waveform shown in FIG. 8 has the same period (e.g., about 200 Hz) with respect to the positive and negative values of the amplitude, the acceleration being a second order differential value of the vibration waveform represents a vibration with equal positive and negative values, and thus, no direction feeling of the force sense is presented.

FIG. 9 shows a vibration waveform including different frequencies for a half period. These frequencies are 100 Hz and 50 Hz. It should be noted that the examples of vibration waveforms shown in FIGS. 6 and 7 have different frequencies for the forward path and the return path of the vibration. However, the vibration waveform shown in FIG. 9 (the same shall apply to FIG. 10) has different frequencies for each half period when the polarity of the acceleration is switched as described above. In such a vibration waveform, the acceleration being the second order differential value of the vibration waveform does not have the equal positive and negative values, a force sense is generated on the side in which the absolute value of the acceleration is larger, and thus, the direction feeling thereof is presented.

FIG. 10 shows a vibration waveform including different frequencies for each half period. These frequencies are 200 Hz and 50 Hz. Also in this case, the acceleration being the second order differential value of the vibration waveform does not have the equal positive and negative values, a force sense is generated on the side in which the absolute value of the acceleration is larger, a difference between accelerations larger than the difference between the accelerations shown in FIG. 9 is caused, and the direction feeling of a larger force sense is presented.

Further, by using the parabolic vibration waveform shown in FIGS. 9 and 10, it is possible to apply the detection threshold value of the tactile receptor, allow the frequency area of the non-tactile sense to the tactile sense to coexist within a period of a vibration, and present a larger force sense to the user. Moreover, because it is possible to present, to the user, such a large force sense, it is also possible to give, to the user, a larger force sense to which the direction feeling of a force sense is added in addition to the difference between frictional forces of a non-tactile sense to a tactile sense.

The vibrations shown in FIGS. 9 and 10 can be said to include (two) different frequencies for each half period when the polarity of the acceleration is switched, and a plurality of (two) different amplitudes. These vibrations correspond to the example 4 of the table in FIG. 5.

Note that in the case where the above-mentioned parabolic vibration waveform (see FIGS. 9 and 10) is used, it may be also possible to apply the force sense presentation device 100 to a device having a form where the user is capable of touching the movable body 10 or the enclosure 30 that generates a reaction force of the movable body 10 with not the arm but the finger, e.g., a card-type device or a smartphone-type device. In this case, it is possible to generate a change in the force sense for the moved finger (finger tracing). It is possible to present a pseud shape feeling and a slope feeling for the finger tracing. In the case where a force sense against the moving direction of the finger is given to the user, it means an upward slope feeling. In the case where a force sense in the same direction as the moving direction of the finger is given to the user, it means a downward slope feeling. For example, in the case where the map information includes altitude information or height information that is more detailed than the altitude information, the control unit 50 may present an upward slope feeling or downward slope feeling to the user depending on the altitude information or height information. The height information that is more detailed than the altitude information represents information on a concavity and convexity of constructions such as stairs.

As described above, the actuator unit 20 according to this embodiment includes the X actuator 20x and the Y actuator 20y. Therefore, the X driver 60x and the Y driver 60y cooperate with each other, generate their driving signals, and combine the driving signals, and thus it is possible to present, to the user, a frictional force controlled in an arbitrary direction on the x'-y' plane, i.e., a force sense via the movable body 10 or the enclosure 30 that generate a reaction force of the movable body 10. Specifically, the present technology is capable of achieving the force sense presentation device 100 that uses a new method of presenting a force sense.

[Use Example and Operation Example of Force Sense Presentation Device]

1) Use Example and Operation Example 1

Figure 11:
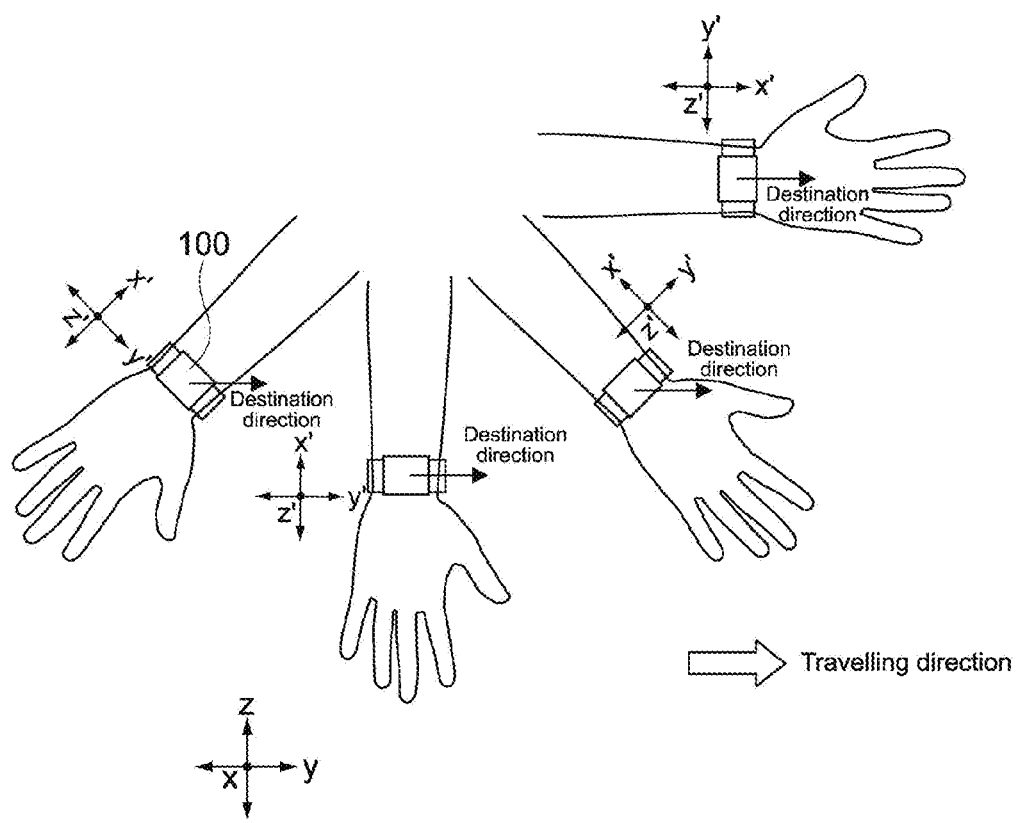
FIG. 11 A diagram showing a use example 1 of the force sense presentation device by the user.

FIG. 11 is a diagram showing a use example 1 of the force sense presentation device 100 by the user. The control unit 50 causes the signal generation unit 60 to generate a driving signal so that a force sense in a particular direction in the global coordinate system, i.e., a direction that points the destination from the present location is presented depending on posture (ever-changing posture) of the force sense presentation device 100 detected by the posture detection unit 58. That is, in the case where the user wears a wearable device including the force sense presentation device 100, it is possible to present a force sense in a particular direction toward the destination to the user even when the force sense presentation device 100 is in arbitrary posture.

Figure 12:
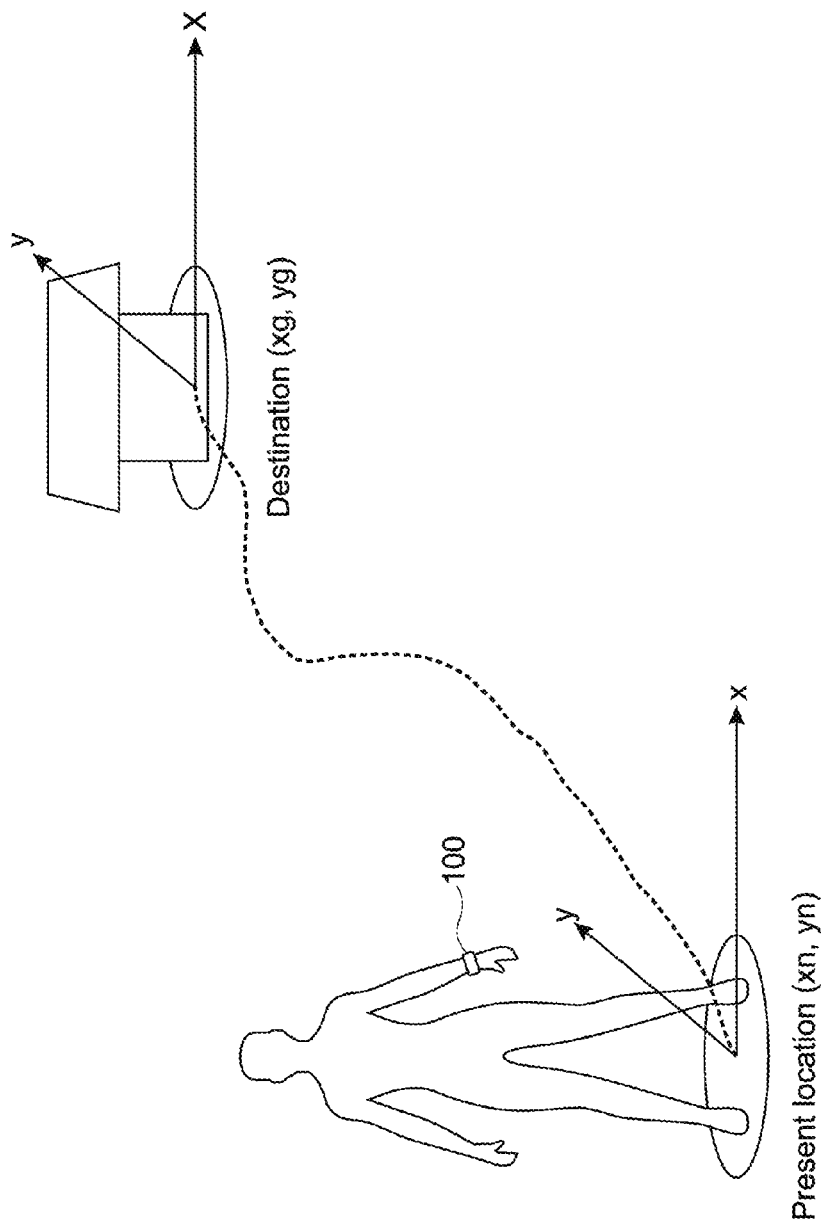
FIG. 12 A diagram showing a coordinate relationship between the present location and destination of the user.
Figure 13:
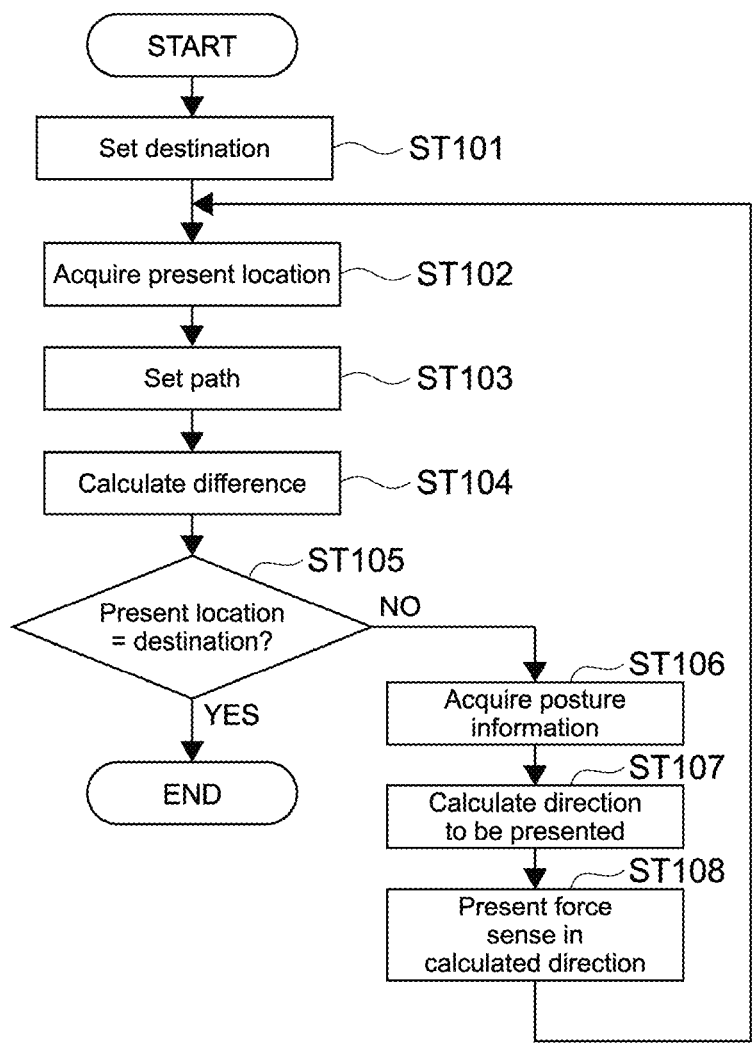
FIG. 13 A flowchart showing processing of a navigation operation performed by the force sense presentation device according to an operation example 1.

FIG. 12 shows a coordinate relationship between the present location and destination of the user. In this embodiment, the global coordinate system is represented by a two-dimensional coordinate on the map. FIG. 13 is a flowchart showing processing of a navigation operation performed by the force sense presentation device 100 according to an operation example 1.

The position calculation unit 56 sets (calculates and stores) a destination (xg, yg) input by the user (Step 101), and acquires a present location (xn, yn) (Step 102). The information on the present location may be set to be constantly acquired. The position calculation unit 56 sets (calculates and stores) a path (Step 103). The position calculation unit 56 calculates the difference between the present location and the destination (Step 104). In the case where the difference is 0 (or the present location is within a predetermined range around the destination (YES in Step 105)), the position calculation unit 56 finishes the processing.

In the case where the difference is not 0 (NO in Step 105), the control unit 50 acquires information on the posture detected by the posture detection unit 58 (Step 106). The control unit 50 calculates a direction on a path to be presented as a force sense to the user on the basis of information on the present location, the set path, and information on the posture of the force sense presentation device 100 (Step 107). The signal generation unit 60 generates a driving signal corresponding to the direction on the path, and presents it as a force sense to the user via the movable body 10 or the enclosure 30 that generates a reaction force of the movable body 10 (Step 108).

Figure 14:
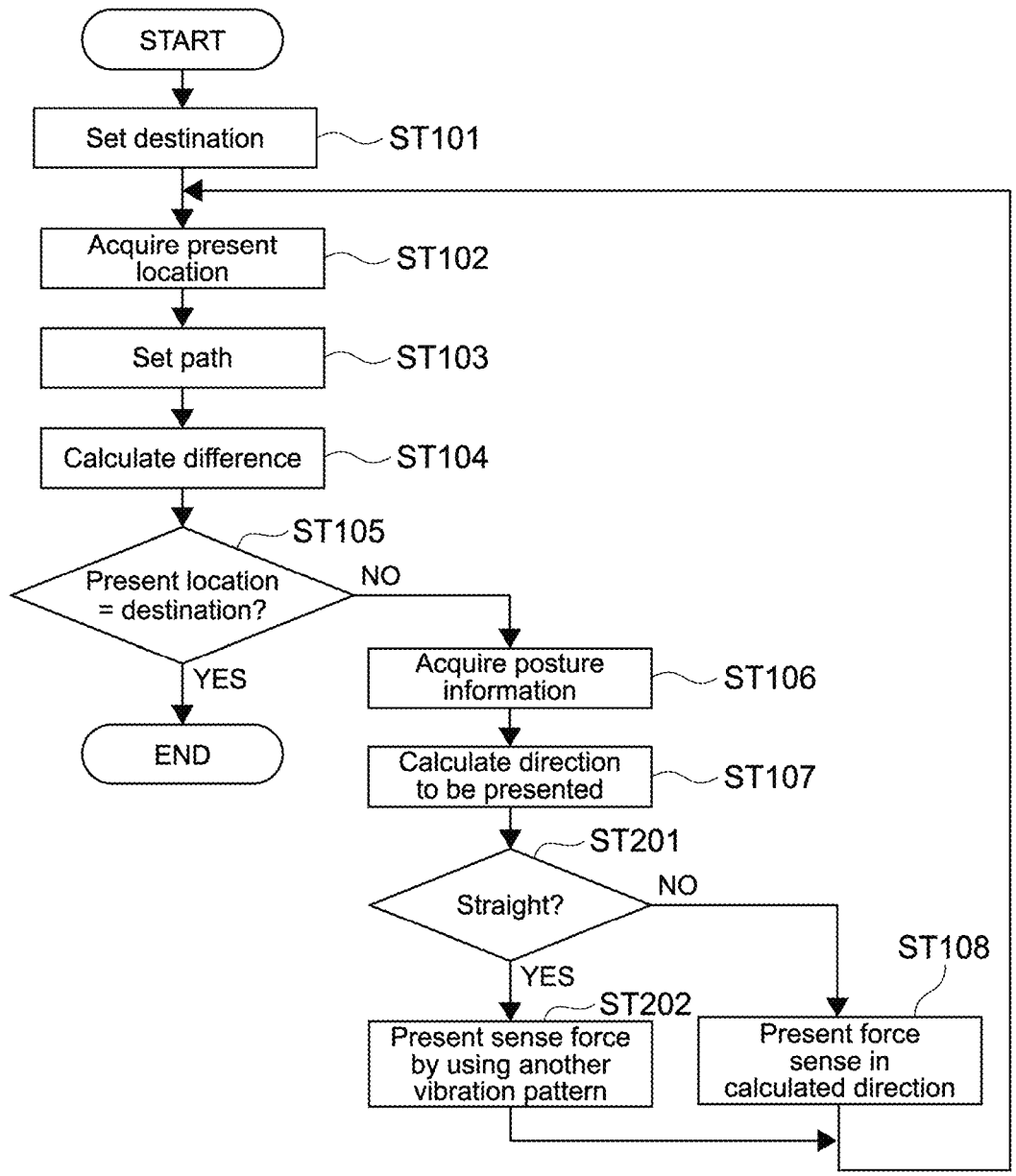
FIG. 14 A diagram showing a modified example of the processing shown in FIG. 13.

Note that in the case where the path calculated in Step 103 is not a straight path, e.g., it is a left, right, or oblique path, processing shown in FIG. 14 only has to be performed. For example, in the case where the path is not a straight path (NO in Step 201), the control unit 50 notifies the user of it by using another vibration pattern to cause the movable body 10 or the enclosure 30 that generates a reaction force of the movable body 10 to vibrate (Step 202).

Examples of another vibration pattern include a vibration pattern that exhibits no particular direction. Examples of the vibration pattern that exhibits no particular direction include a pattern in which the movable body 10 uniformly vibrates, a pattern in which the vibration of the movable body 10 is transmitted from the center to the outside, or a pattern in which the vibration is suppressed from the outside to the center.

2) Use Example 2 and Operation Example 2

Figure 15:
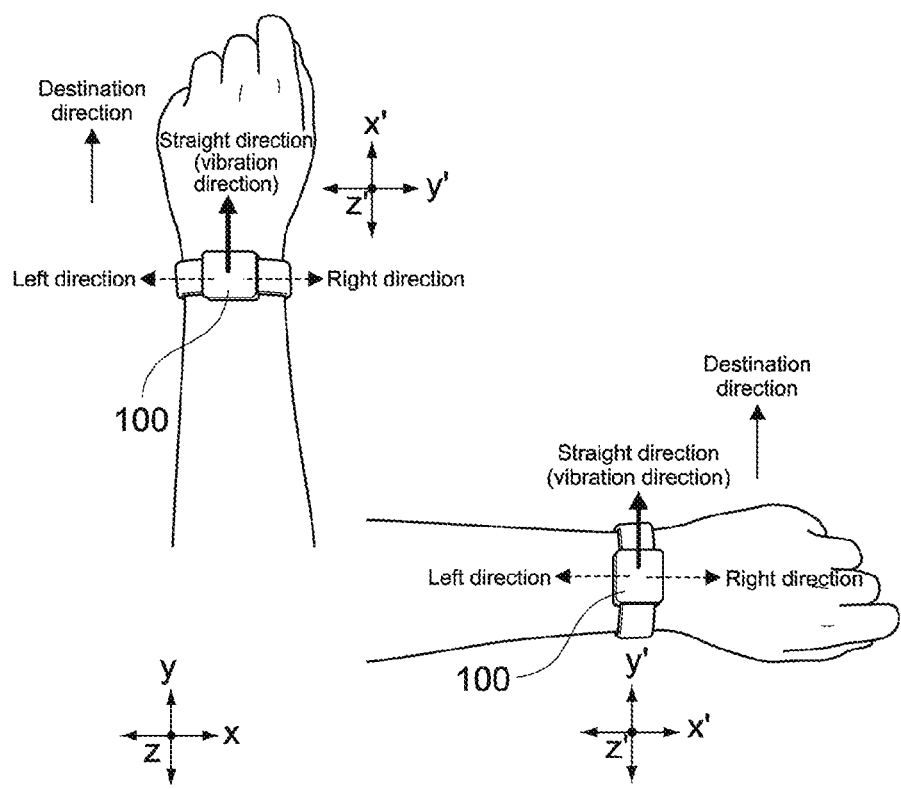
FIG. 15 A diagram showing a use example 2 of the force sense presentation device.

FIG. 15 shows a use example 2 of the force sense presentation device 100. For example, as shown in the left side of FIG. 15, the user may moves his/her arm forward, and receive the presentation of a force sense from the force sense presentation device 100 while causing the x' axis in the local coordinate system to match substantially the destination direction (straight direction).

Further, as shown in the right side of FIG. 15, the user may bend the forward arm 90 degrees, and receive the presentation of a force sense from the force sense presentation device 100 while causing the y' axis in the local coordinate system to match substantially the destination direction (Straight direction).

In this way, even when presentation of a force sense is received from the straight direction to the lateral side, the switching thereof is easy to understand and the user is capable of accurately recognizing the path to the destination.

The operation example of the force sense presentation device 100 in this use example is as shown in the flowchart of FIG. 13.

The force sense presentation device 100 may include a program for the user to select the above-mentioned use examples 1 and 2.

3) Operation Example 3

Figure 16:
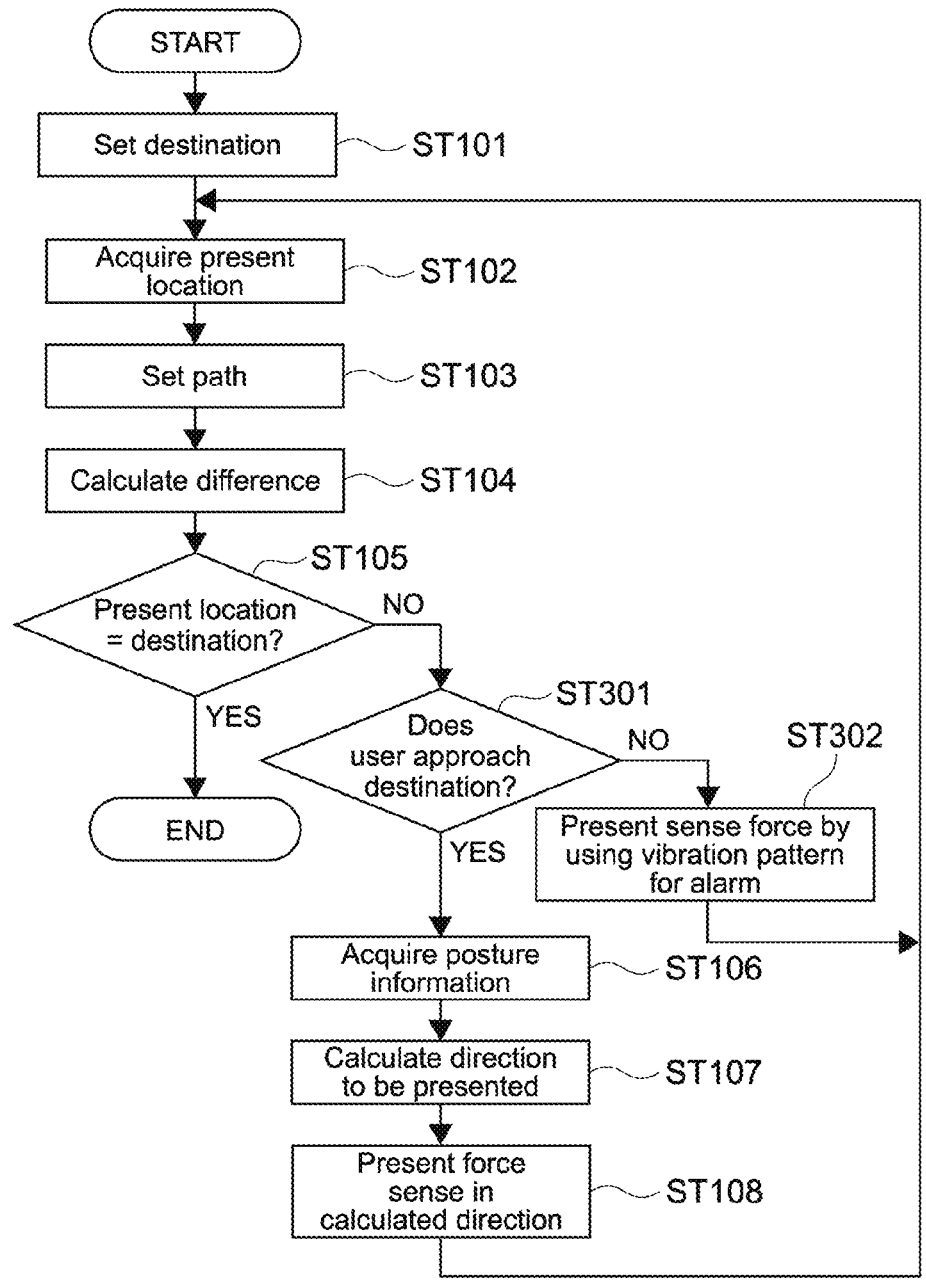
FIG. 16 A flowchart showing processing of the force sense presentation device according to an operation example 3.

FIG. 16 is a flowchart showing processing of the force sense presentation device 100 according to an operation example 3. In this processing, processing different from the processing shown in FIG. 13 is Steps 301 and 302. In Step 301, the position calculation unit 56 determines whether or not the user waring the force sense presentation device 100 approaches the destination. Alternatively, whether or not the user is out of the path may be determined. In the case where the user moves away from the destination (NO in Step 301), the control unit 50 generates vibration for alarm on the movable body 10. The vibration pattern for alarm is a vibration pattern different from a vibration pattern that points one particular direction. In the case where the user approaches the destination (YES in Step 301), the control unit 50 performs processing of Step 106 and subsequent Steps.

According to such operation example 3, the user is capable of reliably knowing that he/she takes a wrong path.

[Force Sense Presentation Device According to Another Embodiment]

Next, a force sense presentation device according to another embodiment of the present technology will be described. In the following description, elements such as the members, the functions, and the like substantially similar to those of the force sense presentation device 100 according to the above-mentioned embodiment will be denoted by the same reference numerals, a description thereof will be omitted or simplified, and different points will be mainly described.

Figure 17:
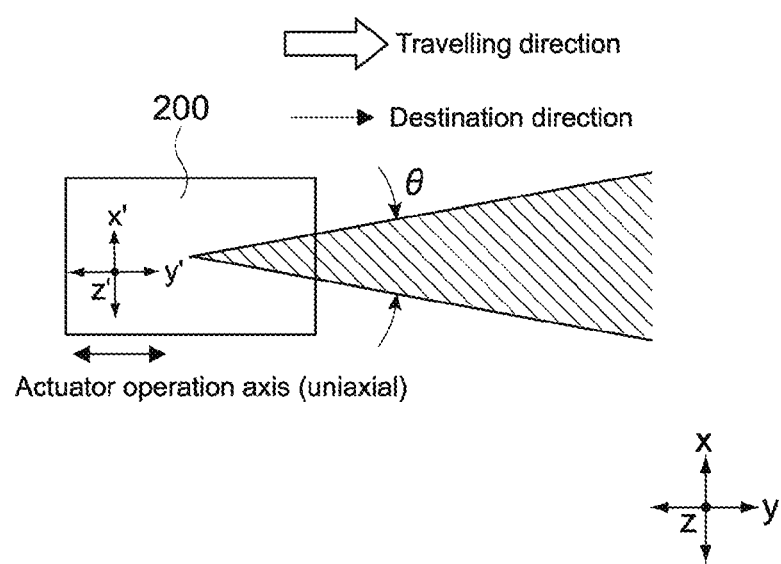
FIG. 17 A diagram showing a use example of a force sense presentation device according to another embodiment of the present technology.

FIG. 17 shows a use example of a force sense presentation device 200 according to another embodiment of the present technology, and the force sense presentation device 100 when viewed from the z-axis direction (vertical direction). The plane on the map is an x-y plane. Although the actuator unit 20 according to the above-mentioned embodiment includes two axes of the X actuator 20x and the Y actuator 20y, this force sense presentation device 200 includes a uniaxial actuator (not shown). Alternatively, in this embodiment, a biaxial actuator is provided and only one axis is used.

For example, this actuator unit includes an actuator capable of vibrating in the y' axis. The actuator has the same configuration and function as those of the actuator according to the above-mentioned embodiment. The control unit 50 is capable of calculating posture uniquely determined in the space of the global coordinate system by the posture detection unit 58, similarly to the above-mentioned embodiment. The force sense presentation device 200 may include an enclosure having a plate shape such as a card-type enclosure and a smartphone type enclosure.

Figure 18:
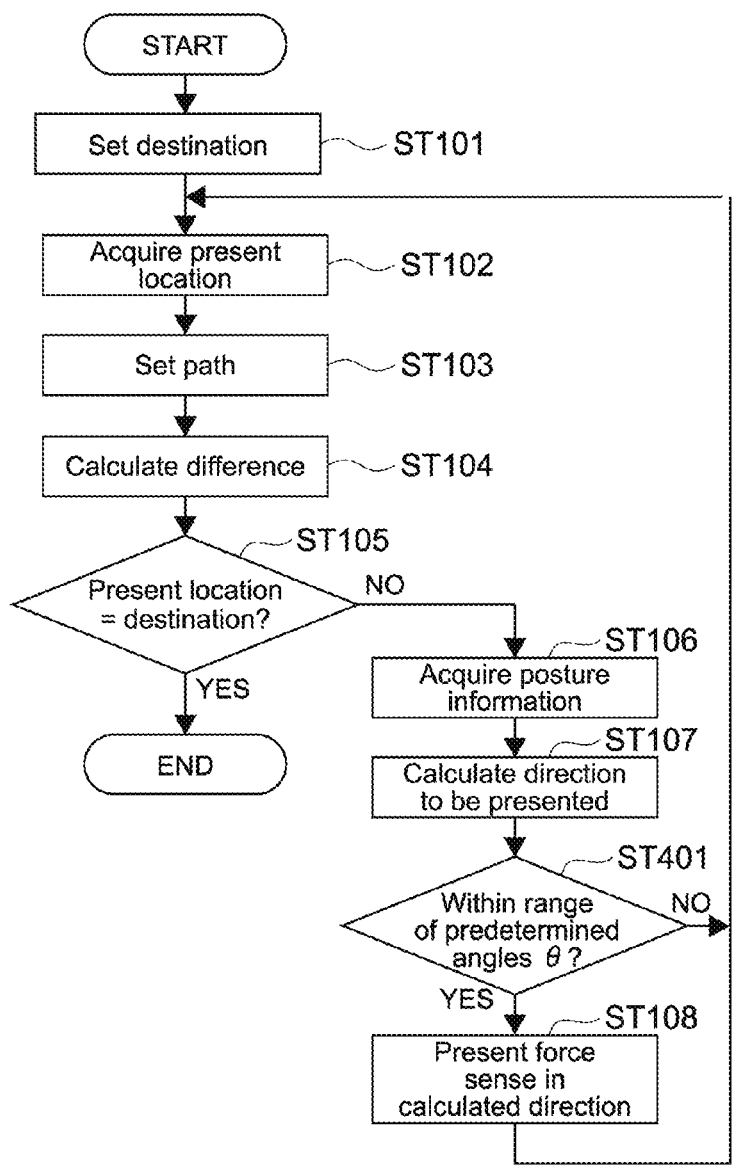
FIG. 18 A flowchart showing processing of this force sense presentation device.

FIG. 18 is a flowchart showing processing of this force sense presentation device 200. In FIG. 18, processing different from that shown in FIG. 14 is Step 401. The user directs the y' axis direction, which is a direction in which a force sense can be presented, to substantially the travelling direction to use this force sense presentation device 200. In Step 401, the control unit 50 determines whether or not the direction calculated in Step 107 is within a predetermined angle range θ including the direction on the path (e.g., a predetermined angle range around the direction on the path in the x-y plane in the global coordinate system). In this case, the control unit 50 functions as a determination unit.

The angle range θ is, for example, 10° to 40°, and is favorably 20° to 30°. This angle range θ may be able to be customized by the user.

The direction calculated in Step 107 is within a predetermined angle range, the control unit 50 generates vibration in the direction on the movable body 10 or the enclosure 30 that generates a reaction force of the movable body 10 to present a force sense in the direction to the user (Step 108). In the case where the direction calculated in Step 107 is not within the predetermined angle range, the control unit 50 does not present a force sense and the processing returns to the processing of Step 106.

As described above, in this embodiment, the user receives the presentation of a force sense when the travelling direction of the user matches the set path direction. Accordingly, it is possible to easily distinguish whether or not the traveling direction of his/her own is right.

[Force Sense Presentation System]

Figure 19:
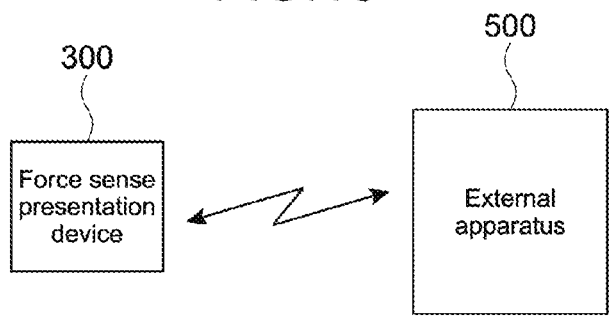
FIG. 19 A diagram showing the configuration of a force sense presentation system according to an embodiment of the present technology.

FIG. 19 shows the configuration of a force sense presentation system according to an embodiment of the present technology. In this force sense presentation system, an external apparatus 500 and a force sense presentation device 300 are provided to be physically separated. Typically, the external apparatus 500 and the force sense presentation device 300 are connected to each other through wireless communication. Examples of a communication unit of the external apparatus 500 and the force sense presentation device 300 include the above-mentioned wide area communication module and narrow area communication module.

The force sense presentation device 300 includes at least the above-mentioned movable body 10, the actuator unit 20 (which may be a uniaxial actuator as in the other embodiment), the enclosure 30, and the posture detection unit 58. The external apparatus 500 includes a signal generation unit that generates a driving signal for driving the actuator unit 20, and a control unit that controls this. Note that the force sense presentation device 300 may include a signal generation unit (the above-mentioned signal generation unit 60).

In the case where the external apparatus 500 and the force sense presentation device 300 are connected to each other through a communication network of wide area communication, the external apparatus 500 functions mainly as a cloud computer. In the case where the external apparatus 500 and the force sense presentation device 300 are in communication with each other through narrow area communication, the external apparatus 500 is typically used as a portable device that is not a wearable device, such as a smartphone. It goes without saying that also the external apparatus 500 may be a wearable device.

[Other Modified Examples]

The present technology is not limited to the above-mentioned embodiments and other various embodiments can be achieved.

Although examples of the axis of a presentation direction of a force sense include uniaxial and biaxial ones in the above-mentioned embodiments, it may be a triaxial one. In FIGS. 1(A) and 1(B), it is possible to achieve the force sense presentation device configured by connecting a Z actuator that is capable of vibrating in a z' axis direction to the rear surface of the movable body 10. With this force sense presentation device, it may be also possible to present a three-dimensional force sense. Accordingly, it is possible to realistically present, to the user, a force sense such as the above-mentioned frictional feeling and slope feeling.

The application target of the force sense presentation device is not limited to navigation. For example, the present technology can be applied also to physical training and other training, e.g., the user uses the force sense presentation device 200 shown in FIG. 17 and checks whether or not the movement of the body of his/her own matches the direction presented by the force sense presentation device 200.

The actuator is not limited to a piezoelectric device, and may be a linear motor such as a voice coil or a device using an eccentric motor that obtains vibration by causing an eccentric shaft to rotate. However, more favorably, it is possible to achieve the high output and size reduction of the force sense presentation devices 100, 200, and 300 by using a piezoelectric device.

The wearable device is not limited to a wrist band-type device and a ring-type device, and may be another device such as a necklace-type device and a glass-type device.

At least two features of the features of the above-mentioned embodiments may be combined.

It should be noted that the present technology may take the following configurations.

(1)

A force sense presentation device, including:

a movable body;

an actuator unit that is connected to the movable body;

a posture detection unit that is configured to detect posture of the force sense presentation device;

a signal generation unit that is configured to generate a driving signal for generating vibration on the actuator unit, the vibration having within a period at least one of a plurality of different amplitudes and a plurality of different frequencies; and a control unit that is configured to control the generation of the driving signal by the signal generation unit depending on the detected posture.

(2)

The force sense presentation device according to (1), in which the control unit is configured to cause the signal generation unit to generate the driving signal depending on the detected posture so as to present a force sense in a particular direction in a global coordinate system, the global coordinate system being a three-dimensional space coordinate system, the force sense presentation device being used in the three-dimensional space coordinate system.

(3)

The force sense presentation device according to (2), further including a position calculation unit configured to acquire information on a present location of the force sense presentation device on a map and calculate a destination on the map and a path from and the present location to the destination, in which the control unit is configured to calculate a direction on the path to be presented as the force sense on the basis of information on the present location and the path.

(4)

The force sense presentation device according to (2), in which the control unit includes a determination unit configured to determine whether or not a posture angle of the force sense presentation device is within a range of angles set in the global coordinate system, and is configured to cause the signal generation unit to generate the driving signal when the posture angle is within the range of set posture angles.

(5)

The force sense presentation device according to any one of (1) to (4), in which the signal generation unit is configured to generate a driving signal such that the actuator unit moves along a first direction under a first frequency and along a second direction opposite to the first direction under a second frequency different from the first frequency.

(6)

The force sense presentation device according to any one of (1) to (4), in which the signal generation unit is configured to generate a driving signal such that the actuator unit moves along a first direction under a first amplitude and along a second direction opposite to the first direction under a second amplitude different from the first amplitude.

(7)

The force sense presentation device according to any one of (1) to (6), in which the signal generation unit is configured to generate a driving signal such that a vibration having an amplitude and a frequency obtained on the basis of a detection threshold value of a tactile receptor is generated on the actuator unit.

(8)

A force sense presentation system, including:

a force sense presentation device that includes a movable body, an actuator unit connected to the movable body, and a posture detection unit configured to detect posture of the force sense presentation device;

a signal generation unit configured to generate a driving signal for generating vibration on the actuator unit, the vibration having within a period at least one of a plurality of different amplitudes and a plurality of different frequencies;

a control unit configured to control the generation of the driving signal by the signal generation unit depending on the detected posture.

(9)

A force sense presentation method, including:

detecting posture of a force sense presentation device, the force sense presentation device including a movable body and an actuator unit connected to the movable body;

generating a driving signal for generating vibration on the actuator unit, the vibration having within a period at least one of a plurality of different amplitudes and a plurality of different frequencies; and controlling the generation of the driving signal depending on the detected posture.

REFERENCE SIGNS LIST 10 movable body
20 actuator unit
20x X actuator
20y Y actuator
50 control unit
52 input unit
54 communication unit
56 position calculation unit
58 posture detection unit
60 signal generation unit
60x X driver
60y Y driver
100, 200, 300 force sense presentation device
500 external apparatus

The invention claimed is:

1. A force sense presentation device, comprising:
a movable body;
an actuator unit connected to the movable body; and
at least one processor configured to:
detect a posture of the force sense presentation device;
generate a driving signal based on the detected posture;
determine at least one of a first frequency of a vibration pattern or a first amplitude of the vibration pattern, based on the generated driving signal and detection threshold values corresponding to at least one tactile receptor; and
generate the vibration pattern on the actuator unit, based on at least one of the determined first frequency or the determined first amplitude.

2. The force sense presentation device according to claim 1,
wherein the at least one processor is further configured to generate the driving signal such that a force sense is presented in a first direction in a global coordinate system, and
wherein the global coordinate system is a three-dimensional space coordinate system.

3. The force sense presentation device according to claim 2, wherein the at least one processor is further configured to:
acquire information corresponding to a current location of the force sense presentation device on a map and a destination location of the force sense presentation device on the map; and
calculate a path from the current location to the destination location; and
calculate the first direction of the force sense based on the current location and the calculated path.

4. The force sense presentation device according to claim 2, wherein the at least one processor is further configured to:
determine a posture angle of the force sense presentation device that is within a range of a plurality of angles that are set in the global coordinate system; and
generate the driving signal based on the determined posture angle.

5. The force sense presentation device according to claim 1,
wherein the at least one processor is further configured to generate the driving signal such that:
the actuator unit vibrates in a second direction at a second frequency, based on the generated driving signal and
the actuator unit vibrates in a third direction at a third frequency, based on the generated driving signal,
wherein the second direction is opposite to the third direction, and
wherein the second frequency is different from the third frequency.

6. The force sense presentation device according to claim 1,
wherein the at least one processor is further configured to generate the driving signal such that:
the actuator unit vibrates in a second direction at a second amplitude, based on the generated driving signal, and
the actuator unit vibrates in a third direction at a third amplitude, based on the generated driving signal,
wherein the second direction is opposite to the third direction, and
wherein the second amplitude is different from the third amplitude.

7. A force sense presentation system, comprising:
a force sense presentation device; and
an external apparatus communicatively coupled to the force sense presentation device,
wherein the force sense presentation device includes:
a movable body,
an actuator unit connected to the movable body, and
a first processor configured to:
detect a posture of the force sense presentation device, and
transmit the detected posture to the external apparatus,
generate a vibration pattern on the actuator unit based on reception of a driving signal, and
wherein at least one of a frequency of the vibration pattern or an amplitude of the vibration pattern is based on a detection threshold value of at least one tactile receptor, and
wherein the external apparatus includes:
a second processor configured to:
receive the detected posture from the force sense presentation device,
generate the driving signal for generation of the vibration pattern on the actuator unit, based on the received detected posture, and
transmit the generated driving signal to the force sense presentation device.

8. A force sense presentation method, comprising:
in a force sense presentation device:
detecting a posture of the force sense presentation device,
wherein the force sense presentation device includes a movable body and an actuator unit connected to the movable body;
generating a driving signal based on the detected posture;
determining at least one of a frequency of a vibration pattern or an amplitude of the vibration pattern, based on the generated driving signal and detection threshold values corresponding to at least one tactile receptor; and
generating the vibration pattern on the actuator unit, based on at least one of the determined frequency or the determined amplitude.

* * * * *